(12) United States Patent
Yip

(10) Patent No.: US 8,226,413 B2
(45) Date of Patent: Jul. 24, 2012

(54) HEAD MODEL FOR HAIRDRESSING AND BEAUTY TRAINING

(76) Inventor: Wai Mun Linda Yip, Hong Kong (CN)

( * ) Notice: Subject to any disclaimer, the term of this patent is extended or adjusted under 35 U.S.C. 154(b) by 497 days.

(21) Appl. No.: 12/456,952

(22) Filed: Jun. 25, 2009

(65) Prior Publication Data

US 2010/0227300 A1 Sep. 9, 2010

(30) Foreign Application Priority Data

Mar. 4, 2009 (JP) .................................. 2009-001239

(51) Int. Cl.
*G09B 19/10* (2006.01)
(52) U.S. Cl. ........................................................ 434/94
(58) Field of Classification Search .................... 434/94, 434/100, 262, 267, 270, 295, 296; 446/100, 446/321
See application file for complete search history.

(56) References Cited

U.S. PATENT DOCUMENTS

| | | | | |
|---|---|---|---|---|
| 5,046,986 A | * | 9/1991 | Wood et al. .................... | 446/321 |
| 5,090,910 A | * | 2/1992 | Narlo .............................. | 434/82 |
| 5,676,584 A | * | 10/1997 | Perryman ..................... | 446/321 |
| 5,848,900 A | * | 12/1998 | Pearson ........................ | 434/236 |
| 6,109,921 A | * | 8/2000 | Yau ................................ | 434/100 |
| 6,758,717 B1 | * | 7/2004 | Park et al. ..................... | 446/391 |
| 6,884,080 B2 | * | 4/2005 | Thompson ..................... | 434/295 |
| 7,186,212 B1 | * | 3/2007 | McMullen ..................... | 600/38 |
| 2003/0175663 A1 | * | 9/2003 | Fuchs ............................ | 434/94 |
| 2006/0008780 A1 | * | 1/2006 | Pang .............................. | 434/94 |
| 2007/0054254 A1 | * | 3/2007 | Cook et al. .................... | 434/262 |
| 2007/0269772 A1 | * | 11/2007 | Taya ............................... | 434/94 |
| 2009/0275001 A1 | * | 11/2009 | Kubo ............................. | 434/94 |

* cited by examiner

*Primary Examiner* — Kurt Fernstrom
(74) *Attorney, Agent, or Firm* — Milbank, Tweed, Hadley & McCloy LLP

(57) ABSTRACT

A human head model for hairdressing and beauty training is disclosed. The head model comprises: a head component having a neck portion; a skin portion covered over the head component; and a plurality of connecting assemblies provided on the neck portion of the head component and the skin portion; wherein the skin portion is fixed to the head component via the plurality of connecting assemblies. The connecting assembly may be a rivet or a snap button. The present invention is of stable structure. For the skin portion and the head model are separate parts, and the head component is reusable, which saves materials and caters for environment protection. Meanwhile, the skin portion is of light weight, and occupies small space, which saves costs of transportation. The head model is adapted for use in haircut practice and also in dressing practice.

4 Claims, 3 Drawing Sheets

HEAD MODEL FOR HAIRDRESSING AND BEAUTY TRAINING

The present invention relates to a teaching appliance for hairdressing, and in particular to a head model for hairdressing and beauty training.

In the teaching of hairdressing, a human head model is usually used for haircutting and dressing training such as demonstrating, practice and competition. The normally used head model is of an integrated structure, that is to say, the skin portion with hair is integrated to the head component of the head model. This structure is convenient for use, however with the use times increasing, the hair becomes shorter until it can not be used any more, and then the whole head model has to be discarded. This is a waste of materials, increases costs and is also bad for environment protection. Furthermore, if the head model is made of PVC and with Polyurethane as inside fillings, it may generate harmful gas and cause environment pollution during the incineration treatment of the discarded head model. To solve these problems, the skin portion and the head component are separated in some of the known head models, and the skin portion is fixed to the head component by rubber band or needle, which caters for environment protection, but the skin portion may easily become loose in use and thus affects the training.

SUMMARY OF THE INVENTION

Having outlined the state of the prior art and its attendant shortages, it is an object of the present invention to provide a head model for hairdressing and beauty training which is of stable structure and is environment protective and reusable.

The above object of the present invention is achieved by the following technical solutions:

A head model for hairdressing and beauty training comprises a head component having a neck portion; a skin portion covered over the head component; and a plurality of connecting assemblies provided on the neck portion of the head component and the skin portion; wherein the skin portion is fixed to the head component via the plurality of connecting assemblies.

In order to facilitate the skin portion to be sleeved onto the head component, the skin portion has two openings, the two openings extend respectively from positions corresponding to a left ear portion and a right ear portion of the head component to the lower end of the skin portion, the skin portion is made of soft synthetic resin, and a part of each of the connecting assemblies is located near the edge of the opening.

Preferably, the head component is a hollow plastic head, the neck portion is provided with a base for connecting with a support bar, the base is threaded to the plastic head; the bottom of the base is provided with a recess for receiving the support bar, a plurality of protruding ribs are provided on the sidewall of the recess; the other part of each of the connecting assemblies is located on the neck portion of the plastic head at a position corresponding to the part of each of the connecting assemblies on the skin portion.

Preferably, each of the connecting assemblies comprises a rivet and a hole; the hole is provided near the edge of the opening of the skin portion, the rivet is provided on the neck portion of the plastic head at a position corresponding to the hole, a hook portion of the rivet extends into the inside of the plastic head, and a cap portion of the rivet on the surface of the plastic head is jointed to the hole of the skin portion.

The cap portion of the rivet may be hemispherical, conical, or trapezoid-shaped, etc., and the outer surface of the cap portion may be a smooth surface.

The rivet may be further provided with a collar for adjusting the inserting level of the hook portion of the rivet, and a plurality of grooves for receiving the collar are arranged on the rivet so as to be adapted to the skin portion with different thickness, and the assembly position of the collar on the rivet is determined by the thickness of the skin portion.

The connecting assembly may be a snap button, the cap member of the snap button is mounted near the edge of the opening of the skin portion, and the core member of the snap button for engaging with the cap member is mounted on the plastic head at a position corresponding to the cap member. The cap member is of a smooth outer surface.

When the above head model for hairdressing and beauty training is in use, if the connecting element is a rivet, it is only necessary to open the opening of the skin portion to sleeve onto the plastic head, and then hitch the skin portion onto the rivet by using the elastic characteristic of the skin portion; when the hair on the skin portion is cut short and can not be used any more, it is only necessary to release the skin portion from the rivet to replace the skin portion. If the connecting assembly is a snap button, the similar operation is taken to open the opening of the skin portion to sleeve onto the plastic head, and the cap member of the snap button on the skin portion is engaged with the core member on the plastic head to enable the fastening; it is only necessary to release the snap button to remove the skin portion when replacing the skin portion, and the plastic head is reusable.

The present invention is of the following advantages with respect to the prior art:

1. connecting elements such as rivet or snap button are used to fasten the skin onto the plastic head; the structure is thus stable and the skin portion is not easily become loose;
2. the skin portion and the head model are separate parts, and the head component is reusable, which saves materials and costs of transportation and caters for environment protection;
3. the head model of the present invention is adapted for use in haircut practice, and is also adapted for use in dressing practice for the skin portion may be also used as a mask.

DETAILED DESCRIPTION OF THE PREFERRED EMBODIMENT

Many aspects of the invention can be better understood in the following embodiments with reference to the following drawings.

Embodiment 1

Figure 1:
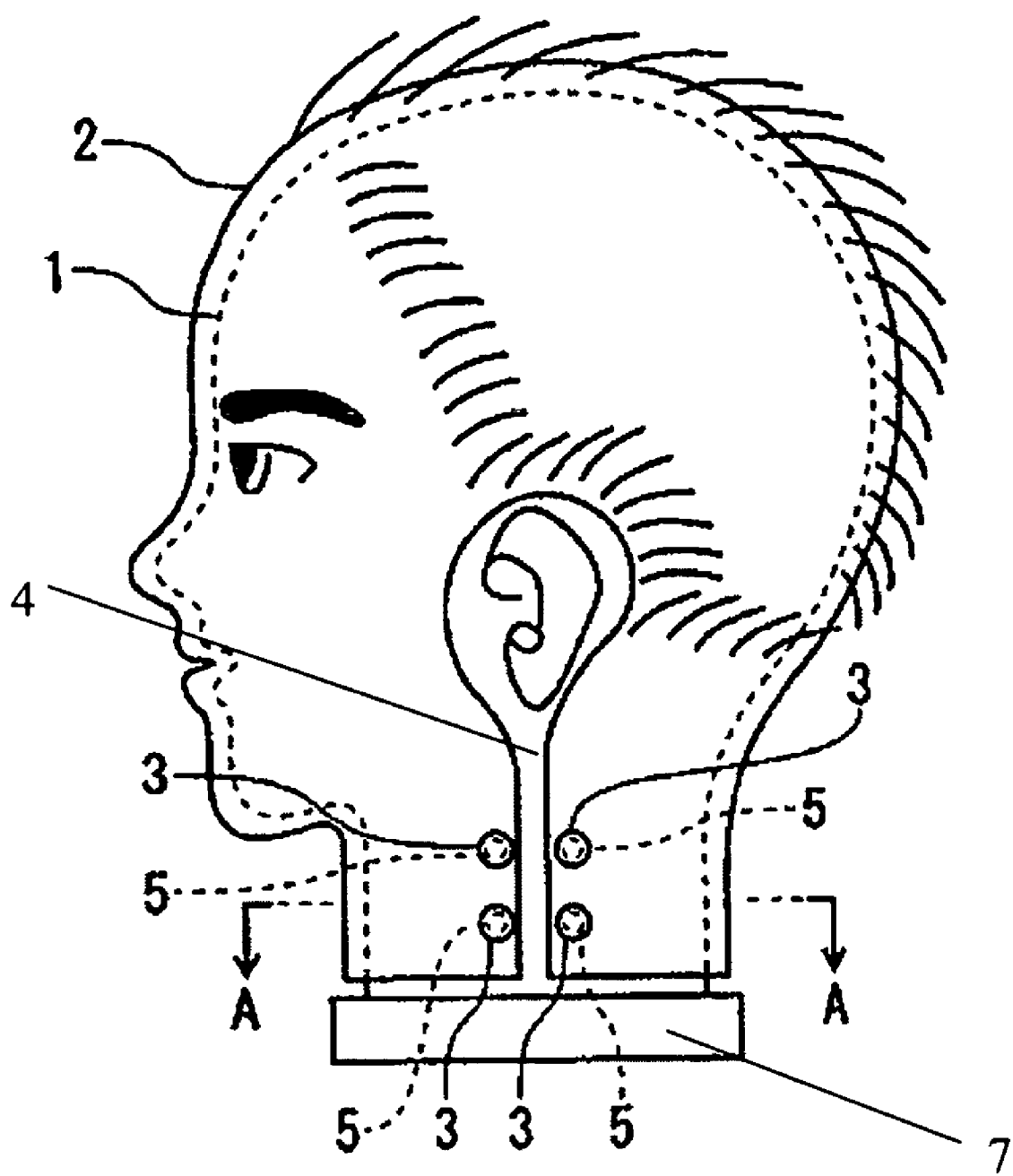
FIG. 1 is a schematic view showing a head model for hairdressing and beauty training according to an embodiment of the present invention in use.

Referring to FIG. 1, a head model for hairdressing and beauty training comprises a head component 1 and a skin portion 2 which is covered over the head component 1. The skin portion 2 is fixed to the head component 1 via a plurality of connecting assemblies provided on the neck portion of the head component and the skin portion.

In order to facilitate the skin portion 2 to be sleeved onto the head component, the skin portion 2 has two openings 4 (one of which is shown in FIG. 1), and the two openings extend respectively from positions corresponding to a left ear portion and a right ear portion of the head component to the lower end of the skin portion. The skin portion 2 is made of soft synthetic resin. Holes 5 as a part of the connecting assembly for joint with the head component are provided near the edge of the opening 4.

The head component is a hollow plastic head 1, the neck portion of which is provided with a base 7 for connecting with a support bar. The base is threaded to the plastic head 1. As shown in FIG. 3, the bottom of the base 7 is provided with a recess 8 for receiving the support bar. A plurality of protruding ribs 9 are provided on the sidewall of the recess 8, so that the base 7 is jointed to the support bar more firmly. Rivets 3 (see FIGS. 1 and 2) as the other part of the connecting assembly for joint with the skin portion 2 are located on the neck portion of the plastic head at positions corresponding to the holes 5 on the skin portion 2 respectively.

Figure 2:
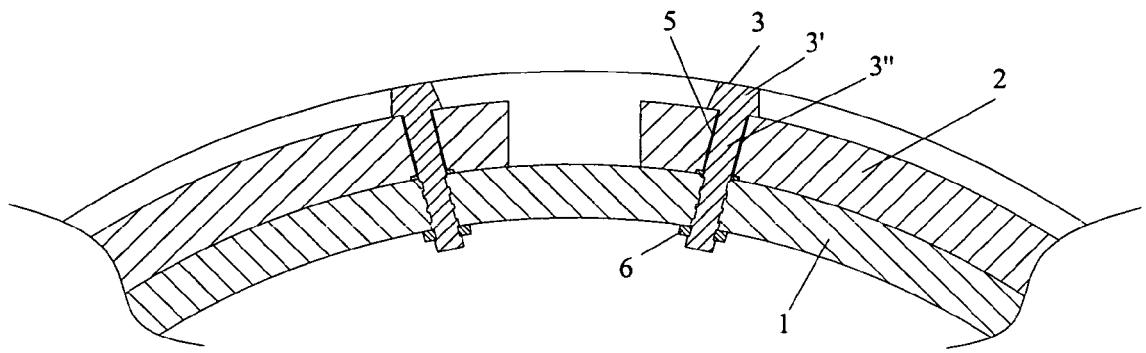
FIG. 2 is an enlarged sectional and partial view of the head model shown in FIG. 1, wherein the connecting assembly comprises a rivet and a hole.
Figure 3:
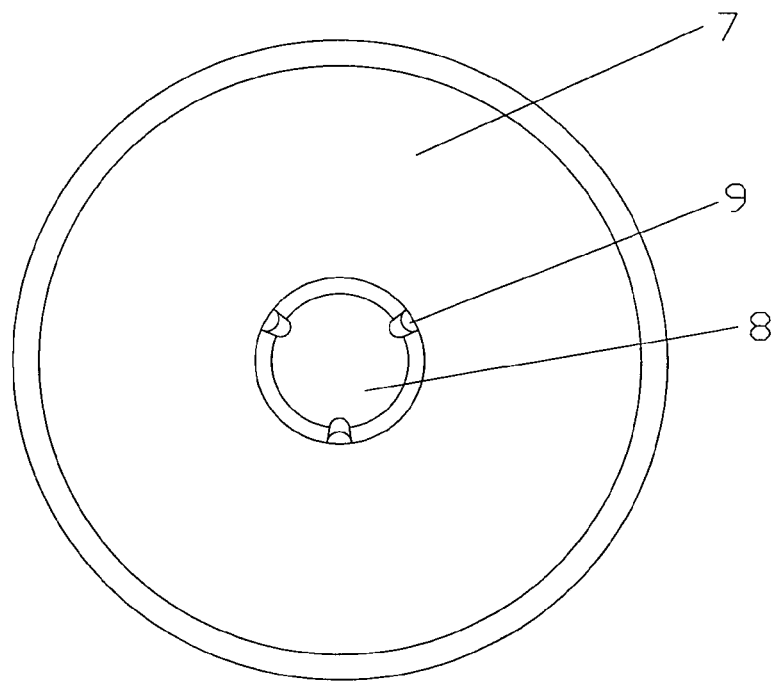
FIG. 3 is a schematic view of the base of the head model seen from the bottom.

Referring to FIG. 2, the connecting assembly for connecting the skin portion with the head component comprises a rivet and a hole. The hole 5 is provided near the edge of the opening 4. The rivet 3 is provided on the neck portion of the plastic head 1 at a position corresponding to the hole 5. A hook portion 3" of the rivet 3 extends into the inside of the plastic head 1, and a cap portion 3' of the rivet 3 on the surface of the plastic head 1 is jointed to the hole 5 of the skin portion 2. The cap portion 3' of the rivet 3 may be hemispherical, conical, or trapezoid-shaped, etc, and the outer surface of the cap portion 3' is a smooth surface.

Figure 4:
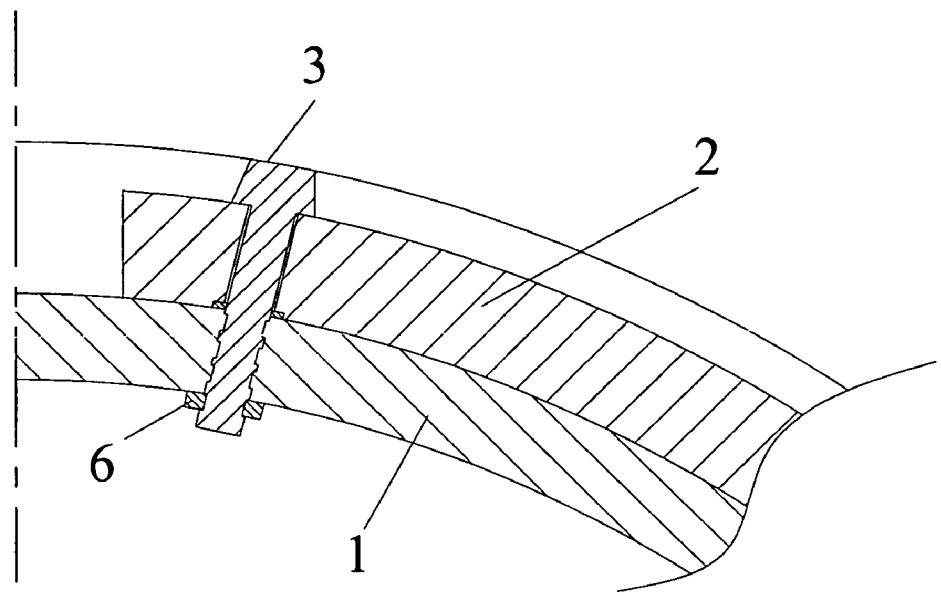
FIG. 4 is a schematic view showing the assembly position of the collar on the rivet when the skin portion is of relative large thickness.
Figure 5:
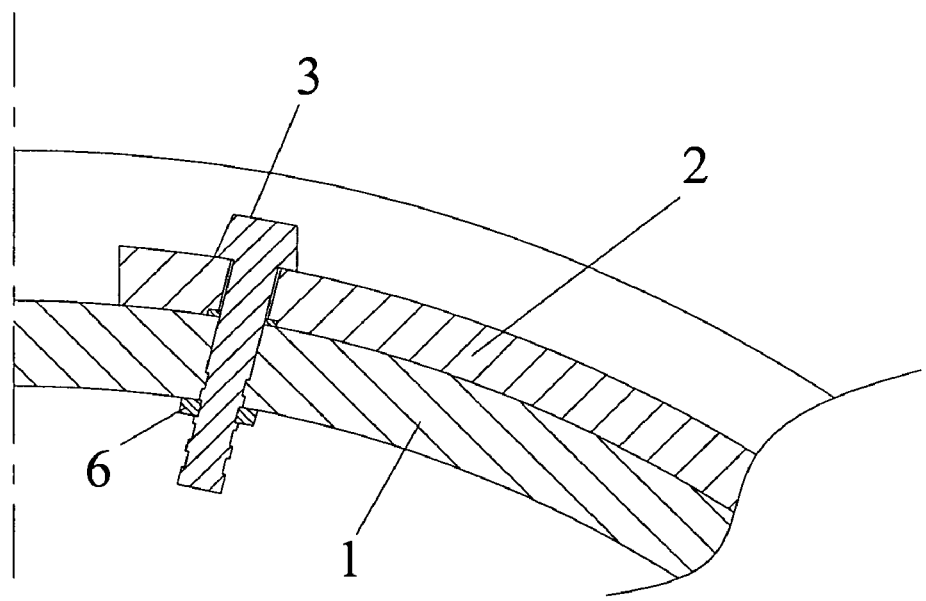
FIG. 5 is a schematic view showing the assembly position of the collar on the rivet when the skin portion is of relative small thickness.

During the manufacturing of the head model, the hook portion 3" of the rivet is inserted into the inside of the neck portion of the plastic head 1, and the cap portion 3' is exposed on the outer surface of the neck portion of plastic head 1. The rivet may be further provided with a collar 6 for adjusting the inserting level of the hook portion 3" of the rivet 3, and a plurality of grooves for receiving the collar 6 are arranged on the rivet 3 so as to be adapted to the skin portion 2 with different thickness, and the assembly position of the collar 6 on the rivet 3 is determined by the thickness of the skin portion 2, so that after the collar 6 is mounted, the length of the hook portion 3" of the rivet 3 exposed from the surface of the plastic head 1 is corresponding to the thickness of the skin portion 2. As shown in FIG. 4, when the thickness of the skin portion 2 is relative large, the assembly position of the collar 6 on the rivet 3 is close to the end of the rivet 3; As shown in FIG. 5, when the thickness of the skin portion 2 is relative small, the assembly position of the collar 6 is apart from the end of the rivet 3.

When the head model for hairdressing and beauty training is in use, it is only necessary to open the opening 4 of the skin portion 2 to sleeve onto the plastic head 1, and then hitch the skin portion 2 onto the rivet 4 by using the elastic characteristic of the skin portion 2; when the hair on the skin portion 2 is cut short and can not be used any more, it is only necessary to release the skin portion 2 from the rivet 4 to replace the skin portion 2, and the plastic head 1 is reusable.

Embodiment 2

This embodiment is similar to the Embodiment 1. However, in this embodiment, the connecting assembly is a snap button, the cap member of the snap button is mounted near the edge of the opening of the skin portion, and the core member of the snap button for engaging with the cap member is mounted on the plastic head at a position corresponding to the cap member. The cap member is of a smooth outer surface.

When the head model for hairdressing and beauty training is in use, it is only necessary to open the opening 4 of the skin portion 2 to sleeve onto the plastic head 1, and the cap member of the snap button on the skin portion 2 is engaged with the core member on the plastic head 1 to enable the fastening; it is only necessary to release the snap button to remove the skin portion 2 when replacing the skin portion, and the plastic head 1 is reusable.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A human head model for hairdressing and beauty training, comprising:
   a head component having a neck portion;
   a skin portion covered over the head component; and
   a plurality of connecting assemblies provided on the neck portion of the head component and the skin portion;
   wherein the skin portion is fixed to the head component via the plurality of connecting assemblies; and
   wherein the head component is a hollow plastic head, the neck portion is provided with a base for connecting with a support bar, the base is threaded to the plastic head; the bottom of the base is provided with a recess for receiving the support bar, a plurality of protruding ribs are provided on the sidewall of the recess; the other part of each of the connecting assemblies is located on the neck portion of the plastic head at a position corresponding to the part of each of the connecting assemblies on the skin portion.

2. The human head model for hairdressing and beauty training of claim 1, wherein each of the connecting assemblies comprises a rivet and a hole; the hole is provided near the edge of the opening of the skin portion, the rivet is provided on the neck portion of the plastic head at a position corresponding to the hole, a hook portion of the rivet extends into the inside of the plastic head, and a cap portion of the rivet on the surface of the plastic head is jointed to the hole of the skin portion.

3. The human head model for hairdressing and beauty training of claim 2, wherein the rivet is further provided with a collar for adjusting the inserting level of the hook portion of the rivet, and a plurality of grooves for receiving the collar are arranged on the rivet.

4. The human head model for hairdressing and beauty training of claim 1, wherein the skin portion has two openings, the two openings extend respectively from positions corresponding to a left ear portion and a right ear portion of the head component to the lower end of the skin portion, the skin portion is made of soft synthetic resin, and a part of each of the connecting assemblies is located near the edge of the opening.

* * * * *